Feb. 2, 1960 YOSHINOBU MORI 2,923,218
CAMERA SHUTTER
Filed June 18, 1957 6 Sheets-Sheet 1

INVENTOR.
BY Yoshinobu Mori.

Feb. 2, 1960  YOSHINOBU MORI  2,923,218
CAMERA SHUTTER
Filed June 18, 1957  6 Sheets-Sheet 2

INVENTOR.
BY Yoshinobu. Mori.

Feb. 2, 1960          YOSHINOBU MORI           2,923,218
                       CAMERA SHUTTER
Filed June 18, 1957                        6 Sheets-Sheet 3

INVENTOR.
BY Yoshinobu Mori

Feb. 2, 1960

YOSHINOBU MORI 2,923,218

CAMERA SHUTTER

Filed June 18, 1957

INVENTOR.

BY Yoshinobu. Mori.

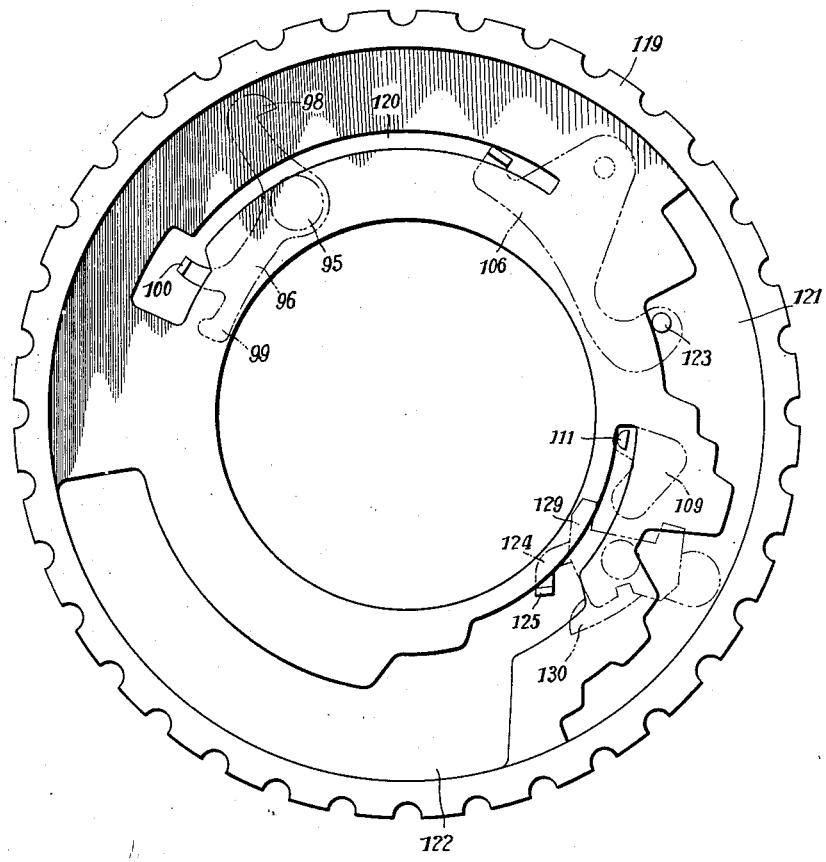

United States Patent Office 2,923,218
Patented Feb. 2, 1960

2,923,218

CAMERA SHUTTER

Yoshinobu Mori, Tokyo, Japan, assignor to Citizen Watch Company, Ltd., Tokyo, Japan Application June 18, 1957, Serial No. 666,417

Claims priority, application Japan July 11, 1956

4 Claims. (Cl. 95—11.5)

The present invention relates to a photographic shutter of the flash synchronizer type, and particularly to such a shutter which is also equipped with an M synchronizer mechanism and a self-timer.

Some of the known shutters having both a self timer and an M synchronizing mechanism are arranged so that the blade actuating mechanism is started directly by the shutter release lever but immediately halted by a separate latch means, before the shutter blades have moved far enough to form any exposure aperture. This preliminary slight movement of the blade actuating mechanism is utilized to actuate the self timer, or to close the M synchronizer contact, and simultaneously releases the M delay governor which has a self-restoring character. At the end of operation of the self timer or the M delay governor, the terminal movement of the latter is used to disengage the latch means, which up until then has been holding the blade actuating mechanism from operating; thereupon, the latter mechanism permits the opening and closing of the shutter blades.

Another approach of a known type also provides direct starting of the blade actuating mechanism and closure of the M synchronizer contact, as above, from the shutter release lever, but the motion of the blade actuating mechanism is allowed to proceed under the retarding effect of the M delay governor until a slight exposure aperture has been formed, whereafter the retarding effect is removed to allow the blades to complete the opening and the ensuing closure of the blades.

In the first type described above, in the halted position of the blades, they have only a limited amount of overlap, which makes for unstable shutter operation. It also eliminates most of the blade pre-travel when the actual aperture-forming motion proceeds, and thus produces a slower effective shutter speed because of the time required to get the blades up to their full velocity. In the second type, the speed is also reduced, because the delay mechanism is still effective at the time when the aperture has started to form. In both types, the use of a single governor for M sync and for self timing requires compromises in design and also yields relatively poor self timer action when both functions are desired simultaneously.

The present invention aims to eliminate the defects of such constructions as noted above, and to provide ancillary improvements such as the elimination of any chance of leakage exposure through partially-overlapped blades prior to exposure initiation, reduction of wear on the M sync mechanism by retraction thereof when not in use, improved operation when both M sync and self timing are wanted, and others.

Briefly, these objects are accomplished by a construction in which the shutter release lever actuates a self timer or an M sync mechanism in a direct manner, instead of through the blade actuating mechanism, and in which the latter is released only after these functions have been completed. Also, the invention utilizes separate self timer and M sync mechanisms which are separately mounted but in proper association with one another, the M sync portion being retractable when its use is not desired. In this way, all of the mentioned disadvantages are overcome.

The invention itself, and the best manner of practicing the same, will better be understood from the following detailed specification of a preferred embodiment thereof, given by way of example and not of limitation, and taken in connection with the appended drawings, in which:

Fig. 8 is a view in elevation of the shutter timing ring.

Figure 1:
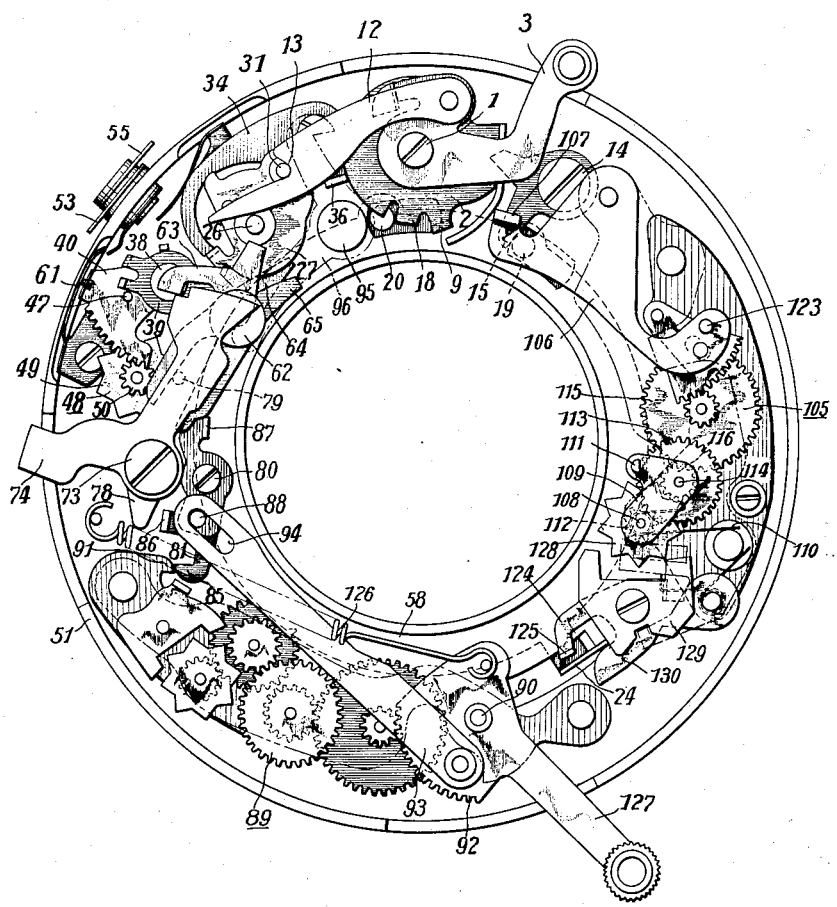
Fig. 1 is a front or elevational view of the shutter as a whole, the front cover being removed for clarity.
Figure 3:
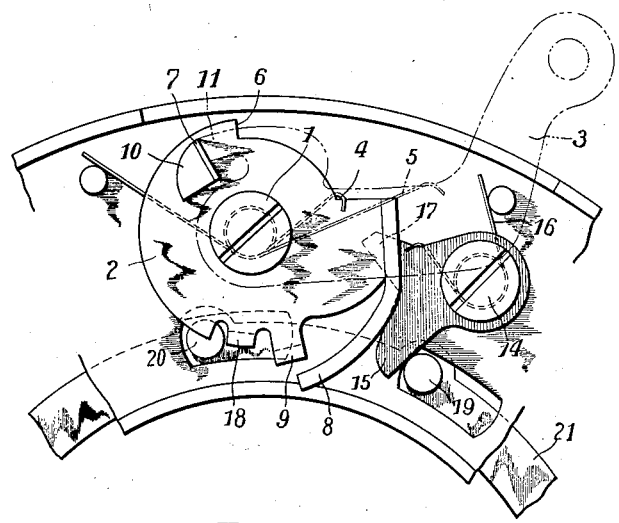
Fig. 3 is a fragmentary view, to a larger scale, of the blade opening and closing parts.
Figure 4:
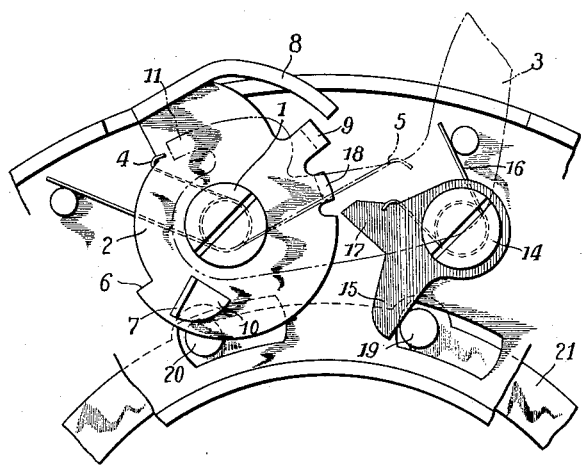
Fig. 4 is a view similar to Fig. 3 with the parts in a different condition.

Referring first principally to Figs. 1 and 3 of the drawings, a main lever 2 and a setting lever 3 are both pivotally mounted on a pivot 1 secured to the annular main support plate of the shutter, these levers being normally urged in the clockwise direction by springs 4 and 5, respectively, wound about pivot 1 as best shown in Fig. 3. Main lever 2 has formed thereon a radial step 6, an upstanding lug 7 supported on the plate by a quadrant pin 10, a striker flange 8, a shutter opening lug 9 and a shutter blade closing lug 18. Setting lever 3 is provided with a drive finger 11 disposed to engage and push the lug 7 of main lever 2 to rotate the latter during anticlockwise motion of the setting lever, and the setting lever also has freely pivoted thereon a drive link 12 having an abutment shoulder 13.

Also freely pivoted on the support plate, at 14, is the blade opening lever 15 normally urged anticlockwise by spring 16 best shown in Fig. 3, the latter figure also detailing a lug 17 formed on lever 15 and disposed for engagement by the blade opening lug 9 of main lever 2 when the latter has been allowed to rotate sufficiently clockwise to allow lug 9 to strike lug 17 and thus to drive lever 15 anticlockwise, and, through engagement thereof with a pin 19 on blade ring 21, to achieve opening of the shutter blades. The connections of the blades themselves with ring 21 are wholly conventional and hence are not shown in detail. Ring 21 also carries a closing pin 20 which will be engaged by the striker flange 18 during a later phase of the rotation of main lever 2, to oscillate ring 21 in the opposite direction and close the blades in a known manner.

Ring 21 also carries a pin 23 best seen in Figs. 5 and 6, and a lug 24 visible in the lower right portions of Figs. 1 and 2, the latter lug to be better described below. Referring for the present to Fig. 7, an M operating plate 27 is freely pivoted at 26 and normally urged clockwise by a spring 28; this plate 27 is arranged to be moved anticlockwise by the engagement of the shoulder or notch 13 of push rod 12 with a pin 31 on the plate 27. Push rod 12 is constrained to slide between the pin 31 and the upper part of pivot 26, passing above a pin 32 on plate 27 which is destined to displace a safety lever, as will be described. Still referring to Fig. 7, a trigger 34 is freely pivoted to the support plate at 33 and urged anticlockwise by spring 35. An upstanding lug 36 on the trigger is disposed to be engaged by the radial step 6 of main lever 2, while at the other end trigger 34 is provided with an end 37 curved to be engaged by a step finger 30 of M operating plate 27.

An M sector actuating lever 39 (see Figs. 5 and 6) and an M sector gear 40 are both freely pivoted to the base plate at 38, a spring 41 urging the sector lever 39 anticlockwise and a spring 42 urging the sector gear 40 clockwise. A lug 43, a bent piece 44 and a projecting part 45 (the latter to be engaged by lug 29) are formed on the M sector actuating lever 39. A riser 46 and a pin 47 (to be pushed by the lug 43 of lever 39) are mounted on the M sector gear 40, and the latter meshes with a gear 50 fitted on the escapement wheel 49 of an M governor 48. These latter parts are best seen in Figs. 1 and 2, which also show the negative electric terminal 53 mounted on the outer shutter casing wall 51. However, the details of the circuit parts are better shown in Figs. 5 and 6, including the washer 52, positive terminal 55, and a mounting screw 57 which secures these parts through the intermediary of washer 52 and insulating bushing 54. Screw 57 also mounts the fixed contact piece 56 disposed to cooperate with the upper free end of an M contact blade 59. In addition, an X contact blade 60 is fixed on a base plate 58 and its free end can be pushed into engagement with the head of screw 57 which is of course in electrical contact with the contact piece 56. The riser 46 of sector gear 40 carries a screw 61 whose position will thus adjust the M delay interval by positioning the contact blade 59.

A safety lever 63, a main lock lever 64 and an auxiliary lock lever 65 are all pivoted on pivot 62, and are respectively urged anticlockwise by springs 66, 67 and 68. These parts are best shown in Fig. 7, which also shows in dotted lines the engaging arm 69 of lever 63, and a projection 70 to be engaged and pushed by the pin 31 of M operating plate 27. The tails 71 and 72 of levers 64 and 65 are arranged to engage and disengage with the step part 30 of the M operating plate 27, tail 71 being a little longer than tail 72.

The shutter release lever or trigger 74 projects out of the casing 51 and is freely pivoted at 73, urged clockwise by spring 75. It has a corner notch 76 to engage arm 69 of safety lever 63, and also has a pushing part 77 and a projection 78. A pin 79 on the underside of shutter release lever 74 is disposed to engage the main lock lever 64. Also shown in Fig. 7 are the hook lever 81 and a lever 82 pivoted at 80 and urged clockwise by springs 83 and 84. Hook 85 and a lug 86 for engagement with projection 78 are part of hook lever 81. A lug 87 (marked in Fig. 1) is formed at one end of lever 82, to engage with one end of auxiliary lock lever 65; a pin 88 is formed at the other end of 82.

Figure 2:
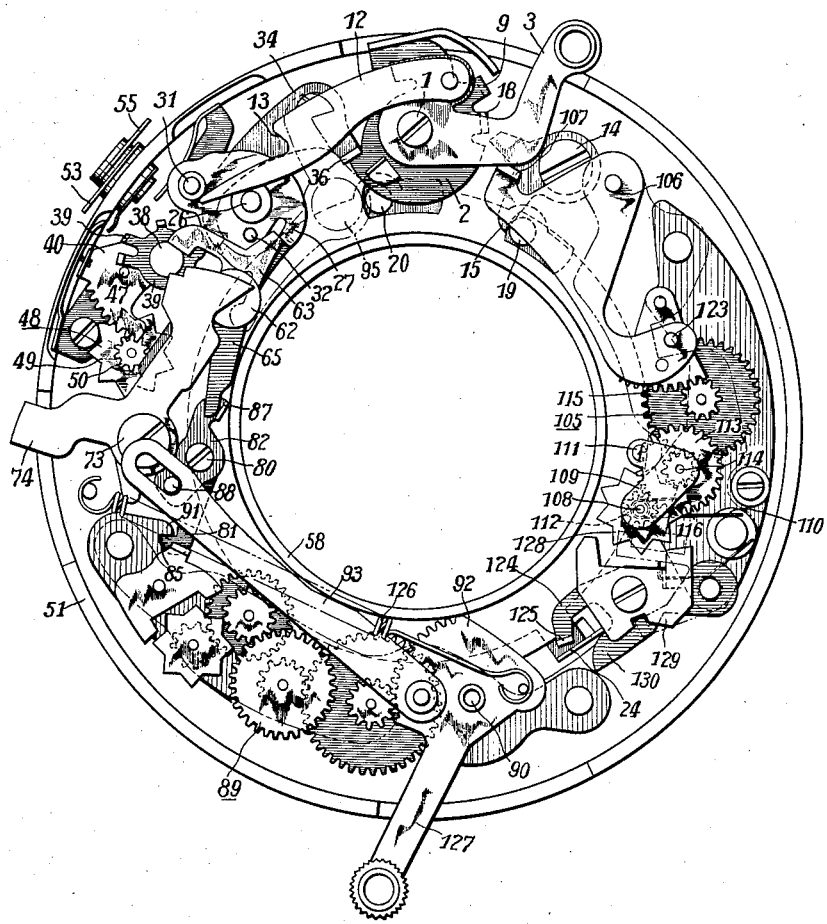
Fig. 2 is a similar view, but with the self timer in set condition.

The self timer is indicated as a whole in Figs. 1 and 2 by the numeral 89, and its details are so well known that they are unnecessary to repeat. It is pivoted to the base plate 58 at 90, and a hook 91 at its other end is engageable by the hook 85 of lever 81. A connecting link 93 has one end pivoted to the main sector plate or gear 92 and a slot 94 at its other end slips over the pin 88 of lever 82. The self timer is wound by lever 127 against the tension of coil spring 126.

A bulb exposure lever 96 is pivoted at 95 (see especially Fig. 8) and is urged clockwise by spring 97. A hook part 98 for cooperation with the lug 7 of quadrant pin 10 is also provided on lever 96. A lug 99 and a riser 100 are provided at the other end of 96, lug 99 engaging the part 77 of shutter release lever 74. An X lever 102 (Figs. 5 and 6) is pivoted at 101 and has a fork 103 at one end and a lug 104 at the other. Fork 103 embraces the pin 23 of blade ring 21, and lug 104 is positioned to engage and deflect contact blade 60.

An escapement mechanism 105 (Fig. 1) is mounted on base plate 58 such that a striker lug 107 on its operating lever 106 may be hit by the striker flange 8 during operation of main lever 2. A rotating arm 109 is pivoted on the shaft 108 of a pallet wheel 128, so that the escapement gear 116 carried by the arm may or may not be engaged with the wheel 115 of the escapement, as also well known to those familiar with shutter timer escapements. A spring 110 normally urges arm 109 anticlockwise. A pin 111 mounted on 109 serves to control the arm's position, as will be described, but the second gear 113 will always engage with pinion 112 on the escapement wheel shaft 108.

A switch control ring 117 (Figs. 5 and 6) is mounted on the back of the shutter casing 51, but has a lug 118 projecting into the casing and through the base plate 58 (Fig. 6) to engage the bent piece 44 of the M sector actuating lever 39. Thus rotation of ring 117 switches from M to X operation, and vice versa. A cam groove 120 (Fig. 8) for controlling lever 96, a cam groove 121 for controlling the shutter speed, and a cam groove 122 for engaging the escapement mechanism, are all formed in the timing ring 119. The riser 100 of bulb lever 96 fits in groove 120, and a pin 123 of operating lever 106 fits in groove 121, for speed control. The pin 111 of rotating arm 109 and a lug 125 on the lever 124 which controls the pallet fork 129, fit into groove 122 for escapement control.

The fine position of pallet fork 129 relative to escapement wheel 128 is regulated by the engagement of a projecting arm 130 (rotatable with lever 124) with an upstanding lug 24 on the blade ring 21.

Operation—"M" synchronization

Figure 5:
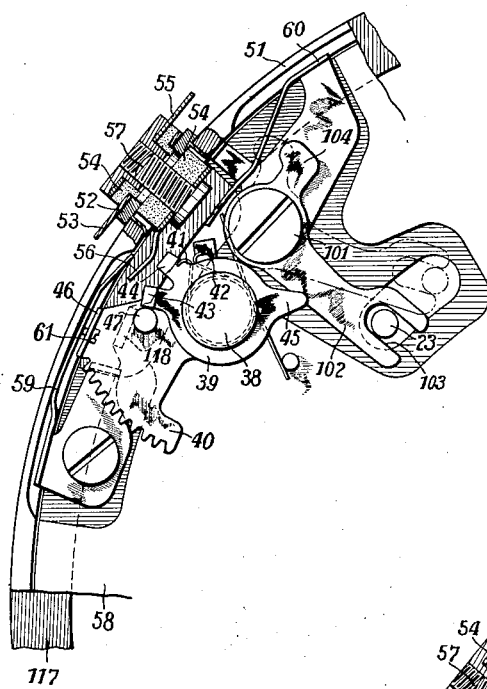
Fig. 5 is fragmentary enlarged view of the synchronizer parts, set for M synchronization.

When the shutter is to be operated in M synchronization, the synchronizing switch ring 117 is rotated anticlockwise around the optical axis to put lug 118 in the position shown in Fig. 5. Then, when the setting lever 3 is rotated anticlockwise against the spring 5, the lug 7 of the quadrant pin 10 will be pushed by the driving finger 11 of the lever 3. The main lever 2 will also rotate anticlockwise against the spring 4. The operating lever 106 of the escapement mechanism 105 will be released from the striking flange 8 of the main lever 2 by the rotation of the latter, and will rotate to a position wherein the receiving part 107 will be hit by the striking flange 8 as the projecting arm 130 of the lever 124 for the pallet fork is pushed by the lug 24 of the sector ring 21, and the escapement wheel 128 and the pallet fork 129 are disengaged from each other. The main lever 2 will rotate while removing the lug 17 of the opening lever 15 clockwise by means of the lug 9. When the lug 9 disengages from the lug 17, the opening lever 15 will return to the original position due to the spring 16.

Thus, when the step 6 of the main lever 2 rotates to the position of the part 36 of trigger 34, said trigger will rotate anticlockwise due to the spring 35, and the part 36 will hang on the step part 6 of main lever 2.

At this time, with the rotation of the setting lever 3, the ling 12 will be pushed leftward in Fig. 1. The pin 31 on the M operating plate 27 will be pushed by the shoulder 13 of the link 12. Said M operating plate will be rotated anticlockwise against spring 28. The M operating plate 27 will first rotate safety lever 63 clockwise against the spring 66 by means of the pin 32 on its upper surface, will disengage the engaging arm 69 of safety lever 63 from the notch 76 of the shutter lever 74, will at the same time push the projecting part 45 of the M sector actuating lever 39 against the spring 41 by means of the lug 29, and will rotate the M sector actuating lever 39 clockwise. When the lug 29 disengages from the projecting part 45, the M sector actuating lever 39 will return to the original position due to the spring 41. Then the M operating plate 27 will rotate the main lock lever 64 clockwise against the spring 67 by means of the step part 30. Thus, when the step part 30 passes the engaging part 71 of the main lock lever 64, the main lock lever 64 will rotate anticlockwise due to the spring 67. When the engaging part 71 engages with the step part 30 of the M operating plate 27, said M operating plate 27 will be engaged. When the setting lever 3 is released, the driving finger 11 will separate from the riser 7 of the pin 10 due to the spring 5, and said set lever 3 will return and the shutter will be set.

Now, in case the self-timer is to be set, the self-timer lever 127 is rotated clockwise against the coiled spring 126, and the swinging self timer 89 will first tend to rotate clockwise around the pivot 90 as a center; the hook 91 will soon engage with the hook 85 of the hook lever 81 and the swinging self timer 89 will be engaged. Thus, with rotation of the self timer lever 127, the link 93 will be pushed leftward in Fig. 1, the pin 88 of the lever 82 pulled by the slot 94 of the link 93 will be released, and the lever 82 will rotate clockwise until its lug 87 gradually contacts the base plate 58. With the rotation of lever 82, lug 87 will disengage the auxiliary lock lever 65, which will also rotate anticlockwise due to the spring 68 to the position wherein the engaging part 72, at the forward end of said lever 65, engages with the step part 30 of the already-rotating M operating plate 27. Thereafter, with the rotation of the self-timer lever 127, the slot 94 of the link 93 will merely slide on the pin 88 of the lever 82 and the link 93 will move. Thus, the self-timer will be set.

In case the self-timer is set before the shutter is set, the auxiliary lock lever 65 will rotate anticlockwise, due to the spring 68, upon the rotation of the lever 82 the same as above. However, when the part 72 at its forward end is stopped against the side of the M operating plate 27, only the lever 82 will separate from the auxiliary lock lever 65, and will rotate while said lock lever 65 remains stationary. The lever 82 will rotate as above until the lug 87 thereof is stopped against the base plate 58. Thereafter, with continued rotation of the self-timer lever 127, the slot 94 of the link 93 will merely slide on the pin 88 of the lever 82, and the link 93 will move. Then as above, when the setting lever 3 is rotated anticlockwise against the spring 5 and the shutter is set, the radial step 6 of the main lever 2 will be engaged with the part 36 of the trigger 34 by exactly the same action as above described. At the same time, the M operating plate 27 will rotate anticlockwise, and when the step part 30 of the M operating plate 27 comes to the position of the part 72 of the auxiliary lock lever 65, the auxiliary lock lever 65 will rotate anticlockwise due to the spring 68, and the engaging part 72 will come against the step part 30. Further, when the M operating plate 27 rotates a little more, and the step part 30 comes to the end of the part 71 of the main lock lever 64, the main lock lever 64 will rotate anticlockwise due to the spring 67, the engaging part 71 of said lever will engage with the step part 30 of the M operating plate 27, and the shutter will be set.

When the shutter is to be released, shutter release lever 74 is rotated anticlockwise against spring 75, the main lock lever 64 will rotate clockwise against the spring 67 (due to the pin 79 secured on the under surface of the shutter release lever 74), and will release the engagement of the step part 30 of the M operating plate 27. At the same time, the lug 86 of the hook lever 81 will be pushed by the projection 78 of the release lever 74. The hook lever 81 will be rotated anticlockwise against spring 83. The hook 85 at the forward end of 81 will be disengaged from the hook 91 of the self timer 89. The latter will be slightly rotated anticlockwise about pivot 90 by the coil spring 126, and will start the operation. The M operating plate 27, disengaged from the main lock lever 64, will start clockwise rotation due to spring 28. However, as soon as plate 27 has made a slight clockwise movement, the step part 30 will be engaged with part 72 of the auxiliary lock lever 65. This engagement will continue during the operation of the self timer 89. Thus, by the operation of the self timer the link 93 will be pulled to the right and downward in Fig. 2, and the slot 94 at the forward end of said link will slide along the pin 88. However, near the end of the swing of the self timer, the end part of slot 94 will move to the position of the pin 88 of the lever 82, and will pull the pin 88. The lever 82 will rotate anticlockwise against spring 84, and the auxiliary lock lever 65 will rotate clockwise against spring 68 (due to lug 87 at the forward end of said lever 82). The part 72 of the auxiliary lock lever 65 will be released from part 30 of M operating plate 27, and the latter will rotate rapidly clockwise due to spring 28. The projection 45 of the M sector lever is engaged by lug 29, and lever 39 is thus rotated anticlockwise. With the rotation of M sector actuating lever 39, the pin 47 of sector gear 40 will be engaged by lug 43, and sector gear 40 will rotate clockwise against spring 42.

With the rotation of sector gear 40, M contact piece 59, pushed by the M delay time adjusting screw 61 attached to the side of 40, will immediately move right and downward in Fig. 1, and will contact the fixed contact 56 and close the M synchronizing circuit. Then, upon rotation of the M sector gear 40, the M governor 48 will be actuated and the necessary time lag will be obtained. Thereafter, the abutment finger 37 of the trigger 34 will be engaged by 30 and will rotate clockwise against spring 35. Lug 36 of trigger 34 will thereafter be disengaged from the radial step of main lever 2, and the latter will rotate quickly clockwise.

After the necessary delay as above, lug 17 of the opening lever 15 will be pushed around by opening lug 9, 15 will rotate quickly anticlockwise, opening operation pin 19 and blade ring 21 will move clockwise, and the blades will open. At the same time, the X lever pin 23 and the lug 24 will also be moved clockwise around the lens axis as a center in Figs. 1 and 3. The lug 24 will be disengaged from the projection 130 of the lever 124 for the pallet fork in the escapement mechanism 105. Said lever 124 will be rotated clockwise, and the escapement wheel 128 and the pallet fork 129 will be engaged with each other. At the same time, the pin 23 for the X lever will rotate the X lever 102 anticlockwise around pivot 101. The X contact piece 60 is pushed upward to the left by the lug 104 of the X lever 102 in Figs. 5 and 6. When the shutter blades have opened to about 80% opening, the X contact 60 will close upon fixed contact 56 and will close the X synchronizing circuit.

Thus, when the rotation of the main lever 2 proceeds and the shutter blades are fully open, the striking flange 8 of the main lever 2 will hit the lug 107 of the operating lever 160 in the escapement 105, and said mechanism will be operated. While this is going on, the lug 9 of the main lever 2 will slide on the lug 17 of the opening lever 15; when the specified time in fractions of a second has passed, the lug 9 will be disengaged from the lug 17, and now the lug 18 of the main lever 2 will rotate the closing operation pin 20 of the driving ring 21 anticlockwise, and will quickly close the blades.

"X" *synchronization*

Figure 6:
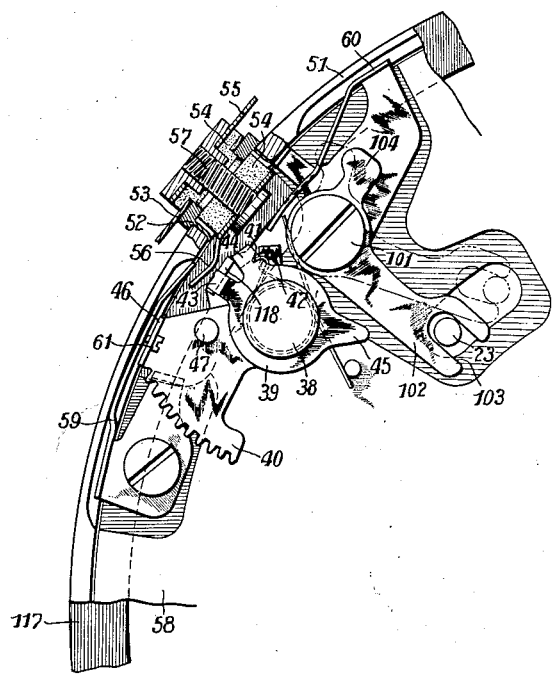
Fig. 6 is a view similar to Fig. 5 but with the parts set for X synchronization.
Figure 7:
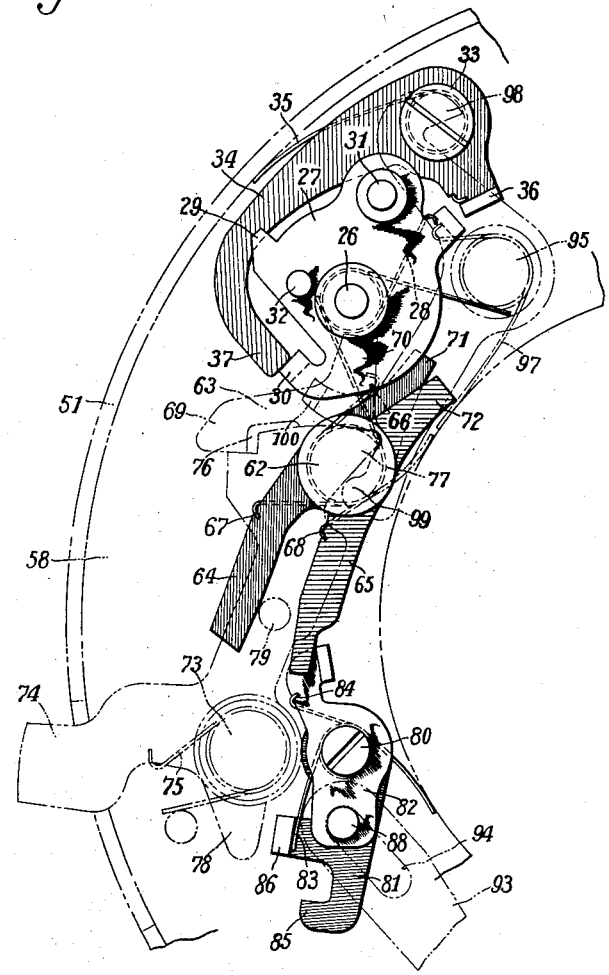
Fig. 7 is an enlarged fragmentary view of the shutter release mechanism parts.

For "X" synchronization, switch ring 117 is positioned so that lug 118 is set in the Fig. 6 position, where it will push the lug 44 of the M sector actuating lever 39 and rotate the latter clockwise against spring 41. When part 45 of lever 39 either sets or releases the shutter, lever 39 will rotate to such a position that it cannot encounter lug 29 of the M operating plate 27. Hence, when the shutter is released, plate 27 will rotate rapidly clockwise without operating the M governor 48 and without closing the M synchronizing circuit. Lug 36 of trigger 34 will be disengaged from radial step 6 of the main lever 2, but that latter will, as before, rotate the opening operation pin 19 thus to open the blades. Pin 23 will also move at this time, and X lever 102 will thereby be rotated anticlockwise and its lug 104 will cause contact from blade 60 to fixed contact 56 (the screw head) at a point when the blades are about 80% open. The X synchronizing circuit will thus be fired. Thereafter, the same as already described, the closing operation pin 20 will be urged anticlockwise by lug 18 of the main lever, and the blades will rapidly close.

*Shutter speed adjustment*

To adjust the shutter operating speed, timing ring 119 is turned, and pin 123 of the operating lever 106 will be moved by the cam groove 122 to change the speed by adjusting the operating distance of lever 106 from the striking flange 8 of the main lever. Concurrently, the escapement wheel 128 and the pallet fork 129 of escapement mechanism 105 will be more or less engaged with one another, as well known. However, for a shutter speed of the range $1/200$ or $1/250$ of a second is required, the timing ring 119 is adjusted to a position at which cam groove 122 will move pin 111 and rotating arm 109 to a position at which the first gear 115 and second pinion 116 of the escapement will be disconnected. The only resistance offered to the main lever will be that of the first gear 115.

*General advantages*

It will be seen from the above description that each of the parts has multiple formations such as lugs, notches, pins and the like, so that a large number of functions are satisfactorily achieved with a compact structure having few total parts, and that all of these are conveniently mounted on the base plate 58. The auxiliary lock lever which is to engage the lug 30 of the M operating plate is also used to release the self timer 80. Thus, for M sync operation, when the switch ring 117 is set for M, the M governor will automatically operate upon shutter release alone without the need for a separate winding operation for the M delay. Further, the auxiliary lock lever is itself operated by the swing of the self timer and the M governor is operated by the release of engagement between the M operating plate and the lever 65, so that the self timer can be very conveniently used even with M sync.

It will also be noted that the double locking provided by levers 64 and 65 and the successive engagements as described herein absolutely prevent any rotation of the main lever 2 during the period when the self timer is running; thus, as contrasted with known shutters, there is no partial release of the energy stored in the main spring, but all is left available until the time for blade actuation has arrived. By the same token, there is no chance of light leakage due to inadequately overlapped blades.

Another very significant advantage lies in the fact that while in conventional shutters the blades are closed by a return spring, so that for fast closing a strong return spring is wanted whose resistance must, however, be overcome by the opening spring to get the blades open, the invention utilizes an arrangement in which the terminal energy of the opening spring itself is used to aid in the blade closing phase. Both speed and optical efficiency (weighted percentage of fully-open shutter time) are thus markedly increased. At the same time, the mechanical construction from which this operation derives, permits the blade driving ring to be put very close to the optical axis, and to execute a smaller arc of motion, both features aiding in raising the shutter speed. Rebound is largely prevented by the fact that the closing operation pin 20 is pressed upon by the lug 18 of the main lever when the blades are closed.

The pin-and-slot connection at link 93 and pin 88 also permits a very compact construction inasmuch as it greatly reduces the total arc of swing of the self timer operating lever 82. Moreover, the use of a floating drive pin 12, sliding between pins 26 and 31 and needing no return spring of its own, provides a minimum of resistance to the rotation of the M operating plate 27, and ensures accurate time lags in this phase.

Numerous other operational and manufacturing advantages are accomplished by the construction as outlined herein, and many of these will be so obvious to those familiar with this subject that it is deemed unnecessary to mention them in detail. However, the construction shown can be varied in certain respects without departing from the spirit of the invention, and it is intended to claim herein all such modifications as properly fall within the scope of the appended claims.

What is claimed is:

1. In a photographic shutter of the flash synchronizer type having a master member, a setting lever, a releasing lever, and blade operating mechanism controlled by said levers, the improvement which comprises a set of normally open synchronizer contacts, a rotatable control plate, a spring urging the plate in one direction, means connecting said setting lever with said control plate to cock the latter, latching means for holding the control plate in cocked condition, an M delay governor movable by said control plate and arranged to close said contacts during an initial phase of its delay cycle and to impede the rotation of said control plate throughout said delay cycle after release of said latching means, means controlled by said release lever for releasing said latching means, selectively operable means for withdrawing said governor from operative impeding relation to said control plate to permit an undelayed exposure, and means operable by said control plate, during a final phase of its rotation to uncocked condition, for releasing said master member to operate said blade operating mechanism.

2. A photographic shutter in accordance with claim 1, including a second set of normally open synchronizer contacts, and means connected to said blade operating mechanism for closing the last-named contacts during opening movement of the shutter.

3. A photographic shutter in accordance with claim 1, including a spring-driven self timer escapement and a winding lever therefor, and in which the means for releasing said latching means is controlled jointly by said release lever and said escapement, when the latter is in wound condition.

4. A photographic shutter in accordance with claim 3, in which the means for releasing said latching means includes a part movable with said release lever and a part driven by said escapement; and a lost-motion connection between the last-named part and said winding lever.

References Cited in the file of this patent

UNITED STATES PATENTS

| | | |
|---|---|---|
| 2,596,671 | Fuerst | May 13, 1952 |
| 2,708,395 | Wagner | May 17, 1955 |
| 2,710,568 | Braun | June 14, 1955 |
| 2,715,357 | Gebele | Aug. 16, 1955 |
| 2,720,144 | Kaden | Oct. 11, 1955 |
| 2,772,614 | Rentschler | Dec. 4, 1956 |